United States Patent [19]

Martino et al.

[11] Patent Number: 5,814,370

[45] Date of Patent: Sep. 29, 1998

[54] ENCAPSULATION OF NANOCLUSTERS IN DRIED GEL MATERIALS VIA AN INVERSE MICELLE/SOL GEL SYNTHESIS

[75] Inventors: Anthony Martino, Albuquerque, N. Mex.; Stacey A. Yamanaka, Dallas, Tex.; Jeffrey S. Kawola, Albuquerque, N. Mex.; Steven K. Showalter, Albuquerque, N. Mex.; Douglas A. Loy, Albuquerque, N. Mex.

[73] Assignee: Sandia Corporation, Albuquerque, N. Mex.

[21] Appl. No.: 664,210

[22] Filed: Jun. 11, 1996

[51] Int. Cl.⁶ .................................................... B01J 13/02
[52] U.S. Cl. .................... 427/213.35; 427/216; 427/219; 427/372.2; 523/211; 428/402.24; 428/404
[58] Field of Search ................................. 427/213.35, 219, 427/216, 372.2; 523/211; 428/402.24, 404

[56] References Cited

U.S. PATENT DOCUMENTS

| | | | |
|---|---|---|---|
| 4,594,134 | 6/1986 | Hanada et al. | 528/34 |
| 5,378,790 | 1/1995 | Michalczyk et al. | 528/35 |
| 5,589,537 | 12/1996 | Golden et al. | 524/80 |
| 5,597,614 | 1/1997 | Noguchi et al. | 427/162 |

*Primary Examiner*—Randy Gulakowski
*Attorney, Agent, or Firm*—Gregory A. Cone

[57] ABSTRACT

A dried gel material sterically entrapping nanoclusters of a catalytically active material and a process to make the material via an inverse micelle/sol-gel synthesis. A surfactant is mixed with an apolar solvent to form an inverse micelle solution. A salt of a catalytically active material, such as gold chloride, is added along with a silica gel precursor to the solution to form a mixture. To the mixture are then added a reducing agent for the purpose of reducing the gold in the gold chloride to atomic gold to form the nanoclusters and a condensing agent to form the gel which sterically entraps the nanoclusters. The nanoclusters are normally in the average size range of from 5–10 nm in diameter with a monodisperse size distribution.

13 Claims, 1 Drawing Sheet

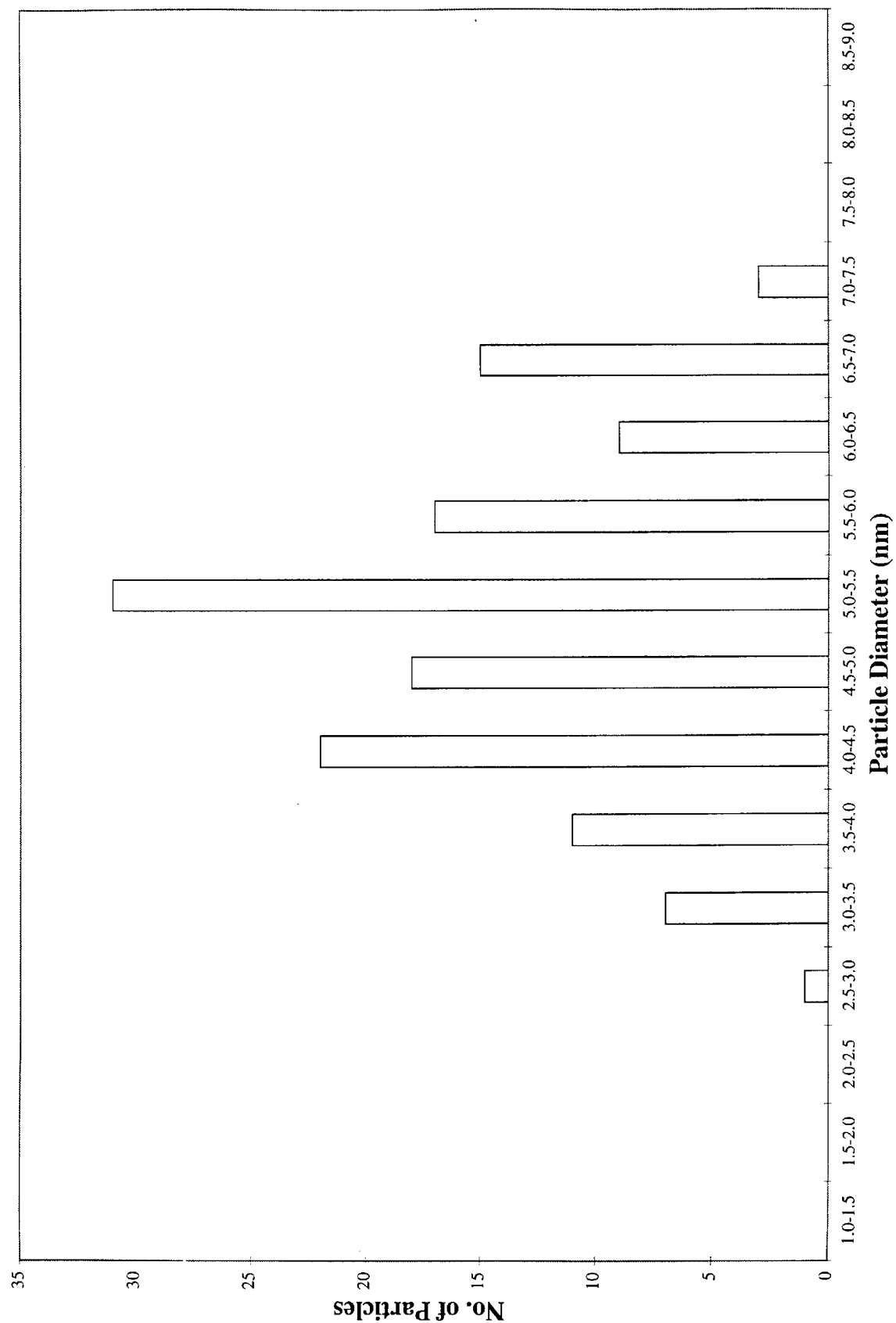

ENCAPSULATION OF NANOCLUSTERS IN DRIED GEL MATERIALS VIA AN INVERSE MICELLE/SOL GEL SYNTHESIS

GOVERNMENT RIGHTS

This invention was made with Government support under Contract DE-AC04-94AL85000 awarded by the U.S. Department of Energy. The Government has certain rights in this invention.

BACKGROUND OF THE INVENTION

This invention relates to metal and semiconductor nanoclusters encapsulated in dried gels of an average size of less than about 10 nanometers in a monodisperse size distribution, both as a product and as a method of making the product. More particularly, the invention relates to a method of making the nanoclusters via an inverse micelle/sol gel synthesis.

Colloidal sized metal and semiconductor particles (1–20 nm) are of significant current interest because they mark a material transition range between molecular and bulk properties. Indeed, even within this range the properties of the nanoclusters can change dramatically between diameter differences of 5 nanometers or less. Hence it is very desirable to be able to tailor the size of a nanocluster precisely and with small deviations from that size in the size distribution (monodisperse). With decreasing colloid size, bulk properties are lost as the continuum of electronic states breaks down (i.e. quantum size effects begin to dominate) and as the fraction of surface atoms becomes large. There are a number of ways to synthesize metal particles with diameters between 1–20 nm (nanoclusters). All synthesis routines include nucleation, growth, and stabilization of the particles and attempt to control particle size, size distribution, chemical composition and structure. Nucleation and growth of the nanoclusters can be initiated by chemical or photolytic reduction, thermal decomposition and vapor phase condensation. Controlling double layer forces with buffers and electrolytes and the use of steric stabilizing agents such as polymers, surfactants and bulky ligand appendages stabilize the particles in solution. Nevertheless, the prior art does not show how to create monodisperse nanoclusters encapsulated in dried gels prepared by sol-gel processing. Such materials are useful in catalysis in their dried gel forms as xerogels and aerogels and also when calcined at higher temperatures.

SUMMARY OF THE INVENTION

Although xerogels and aerogels have been used previously as supports for various materials, the monodisperse nanoclusters encapsulated in the dried gels herein represent a new category of materials in the sense of their nanocluster size range, limited size distribution in conjunction with the dried gel support, and the cluster-gel relationship. The process employed to create these encapsulated nanoclusters is, in brief, the following. A surfactant is mixed with an apolar solvent to form inverse micelles of a particular interior diameter. The material from which the nanocluster is to be formed is added, along with a gel monomer or oligomer precursor solution, to the inverse micelle solution. Appropriate reducing agents are then added to form the clusters followed by the addition of a basic aqueous solution to form the gel, with the gel forming soon thereafter. The resulting gels with the encapsulated nanoclusters are then aged and dried to form xerogels or aerogels. The gel precursor used herein is a silica-based precursor, but other precursors, such as $Al_2O_3$-based, $TiO_2$-based, and $ZrO_2$-based precursors, can also be used. The reducing agent can also be added prior to adding the gel precursor.

BRIEF DESCRIPTION OF THE DRAWING

The drawing is a bar graph of the size distribution of gold nanoclusters indicating average particle size and monodispersity.

DETAILED DESCRIPTION OF THE INVENTION

Synthesis of nanoclusters by metal salt reduction in inverse micelle solutions produces ultra-small, mondispersed particles sterically stabilized in solution by surfactant. Surfactants possess two distinct moieties, a hydrophilic head group and a hydrophobic tail group. They self-assemble in apolar solvents (i.e. toluene, alkanes) to form inverse micelles where the head groups shield themselves from the oleic surroundings. The solution takes on the structure of polar regions approximately 1–10 nm in diameter dispersed in the oleic solvent. Metal salts are solubilized within the interior of inverse micelles, and the addition of a reducing agent initiates nucleation and growth to produce the nanoclusters. The reaction sequence is sustained by material exchange between inverse micelles. The inverse micelle synthesis technique affords mean particle size control and compositional variety. Particle size control results from regulation of the size of the nucleation site (inverse micelle size) and the particle growth rate (material exchange rate between inverse micelles). A variety of metals and bimetallics are produced by choosing different metal salts and mixtures of metal salts. Certain semiconductors can be synthesized as well by using sulfiding agents rather than reducing agents. Unfortunately, the presence of surfactant hinders potential applications (i.e. catalysis), and removal of the surfactant causes immediate flocculation of the particles with loss of the unique and interesting material properties.

We have discovered that by combining sol-gel processing with inverse micelle, nanocluster solutions we can encapsulate or sterically entrap nanoclusters in the micropores of xerogels and aerogels. The nanoclusters remain small, highly dispersed, and monodispersed even after the removal of the surfactant. Sol-gel processing of porous silica gels in polar solvents has been used to encapsulate a variety of large molecules including laser dyes, photochromics, and proteins. Sol-gel encapsulation involves polymerization of a gel precursor, usually tetramethoxysilane or tetraethoxysilane (TEOS), to build the silica gel structure (host) around the dopant (guest). Steric entrapment occurs when the gel pore size is comparable to the dopant size.

Two technical challenges had to be overcome before this invention could be realized. One was accomplishing metal salt reduction and particle stabilization in the presence of a gel polymer. The other was accomplishing the hydrolysis and condensation of the gel polymer in apolar solvents such as toluene. Others have worked in the area of sol-gel processing in apolar solvents. However, the prior art methods did not work for our combination of metal salt solubilization, salt reduction, and sol-gel processing in low c surfactant, alcohol free, alkane inverse micelles. For other prior art inverse micelle systems the surfactant or alcohol concentrations are high and not suitable for monodisperse cluster formation. In response, we established an entirely new system.

These nanocluster, gel materials can find use as catalysts. Metal-gel matrixed materials have been extensively studied as catalysts. The presence of metal or metal oxide particles on gels with tunable surface acidities (i.e. $SiO_2$, $SiO_2/Al_2O_3$ mixtures, $TiO_2$, and $ZrO_2$) can provide bifunctionality to a catalyst material, and sol-gel processing can be used to produce supports with tunable porosities and densities. Metal particle size control and stability are significant issues, however. Metals are traditionally added to xerogels and aerogels when metal salts are ion-exchanged with terminal hydroxyl groups on the gel, through impregnation into the gel backbone during gel processing, or through the use of chelating agents. After the atomic metal-gel matrix is formed, chemical, thermal, and photolytic reduction results in nanometer sized clusters. The metals are subject to sintering under robust catalytic conditions. Encapsulation of metal clusters into gels offers size stability during applications through steric entrapment of the particles. Any unique properties resulting from quantum size effects can be tested in a realistic catalyst environment. In addition, the advantages of the inverse micelle technique are preserved, namely, the synthesis of <10 nm in diameter monodisperse particles, particle size control, and compositional variety.

In the following examples, the inverse micelle solutions and precursor salt solutions are characterized by small angle x-ray scattering (SAXS). After the addition of the reducing agents and sol-gel processing, cluster size, chemical composition, and the cluster growth process are characterized by transmission electron microscopy (TEM), electron diffraction, UV-visible spectrometry, and gel surface areas are determined by $N_2$ porosimetry. Material properties are determined as a function of the gel monomer (TEOS vs. the pre-hydrolyzed form of TEOS), the water to gel monomer reaction stoichiometry (molar ratio=4:1, 3:1, 2:1, and 1:1), surfactant concentration, drying mechanism, and process washing with hexanol.

EXAMPLE 1

(Gold nanoclusters)

The surfactant didodecyldimethylammonium bromide (DDAB), apolar solvent toluene (99.9+% purity), reducing agent lithium borohydride in tetrahydrofuran (2M), gold trichloride, tetraethylorthosilicate (TEOS), and a 40 wt. % tetrabutylammonium hydroxide (TBAOH) in water solution were purchased from Aldrich and used as delivered. Polydiethoxy siloxane (M.W.=610 gm/mol), an oligomer of TEOS formed by an proprietary pre-hydrolysis reaction, was purchased from United Chemical Technologies and used as delivered. Hexanol is used as a washing solvent and is purchased from Aldrich at 99.9+% purity. Other reducing agents and gold salts are known and can be substituted for the specific compounds recited above. This holds true for many of the compounds recited in the examples presented herein.

Surfactant is added to toluene (1–5 wt. %) to form the inverse micelle solution. $AuCl_3$ (0.0001M) and the gel monomer (0.4M) are added, and the solution is stirred until the salt is fully solubilized. A gold colored transparent solution is formed. The $LiBH_4$/THF solution is injected into the salt precursor solution under rapid stirring so that the $[BH_4-]$:$[Au^{3+}]$=3:1. The gold solution immediately turns dark purple. The 40 wt. % TBAOH in water solution is added minutes afterward, and gelation time is marked when the solution no longer flows under gravity. A deep purple, viscous gel is formed. The water to gel monomer ratio is studied as an experimental variable, and is set at 1:1, 2:1, 3:1, and 4:1. Two different gel monomers are tested: TEOS and a pre-hydrolyzed form of TEOS. The gels are aged for fourteen days prior to drying under ambient conditions to form xerogels or under supercritical $CO_2$ extraction to form aerogels. Washing to remove surfactant and reaction by-products is completed by passing warm hexanol over the dried, crushed gels through an aspirator funnel.

The reduction of the gold salt can also precede the addition of the gel monomer and subsequent hydrolysis and condensation reactions in the mixture without causing noticeable changes to the resulting material. Specifically, the process steps set forth immediately above are reordered in the following sequence. After the surfactant is added to toluene to form the inverse micelle solution, the gold salt is added and stirred into the inverse micelle solution, followed by addition of the $LiBH_4$/THF solution. Then the gel monomer is added followed by addition of the TBAOH solution at which point the gel forms as before. The remaining steps are the same as the above example.

SAXS is completed at the Small-Angle Scattering Center at the University of New Mexico. A 12 kW rotating anode source is used with at Kratky camera and an M-Braun linear position sensitive detector. A Ni filter is used as a monochromator, and the samples are sealed in quartz capillary tubes. Particle size and composition in the colloidal solutions are characterized with transmission electron microscopy (TEM) and electron diffraction. These tests are performed with a 300 KeV Phillips CM30 electron microscope. Dried, crushed gels were dispersed over a holey cube substrate. UV-visible spectroscopy is completed with a Hewlett Packard 8452A Diode Array spectrophotometer. Quartz cuvettes are used in liquid samples, and gels are sliced and mounted on quartz microscope slides. BET surface area analysis of the crushed xerogels and aerogels is carried out with a Quantachrome Autosorb-6 surface analysis apparatus.

Small angle x-ray scattering was used to characterize the inverse micelle solutions and the effect of the addition of the gold salt and gel precursors to the solution structures. SAXS is weak but existent in DDAB/toluene mixtures. When gold salt is added or when both gold salt and TEOS are added to DDAB/toluene mixtures, SAXS changes little. Scattering curves are flat and bend only at relatively large q. Guinier analysis indicates the aggregate size remains constant in all three cases ($R_g$=0.49 nm). No small angle x-ray scattering is observed when only TEOS is added to DDAB/toluene mixtures. Finally, scattering and Guinier analysis of gold salt and TEOS solutions after reduction (i.e. after cluster formation, but before hydrolysis and condensation) indicates the cluster size to be $R_g$=2.34 nm.

Formation of the clusters occurs within seconds after addition of the reducing agent. The gold solutions turn purple, the color indicative of the presence of colloidal sized gold. Gelation occurs at 1.5, 2.5, 3.3, and 24 hours for samples with the reaction stoichiometry of 1:1, 2:1, 3:1, and 4:1 molar ratio of TBAOH/water to TEOS. The pre-hydrolyzed TEOS monomer samples gel much more quickly compared to the TEOS monomer. With the molar ratio of TBAOH/water to TEOS oligomer=4:1, gelation occurs in 15 minutes. For reaction stoichiometries of 3:1 and less, gelation occurs within 5 minutes. The basic water solution is fully solubilized in the inverse micelle solution before gelation. The solutions are transparent and clear (yet colored) at all water concentrations and no cloudiness or indication of phase separation is visibly apparent.

All wet gels are transparent, homogeneously deep purple, viscous, and undergo little to no synerises. Drying to form xerogels causes the gels to shrink ⅓ to ½ of their original volume independent of reaction stoichiometry and monomer type. Deep purple monoliths are formed. Drying to form aerogels causes little shrinking in pre-hydrolyzed TEOS gels and shrinks TEOS monomer gels by ½ of their original volume. Aerogels appear chalky and light purple, but regain their color when wetted.

The synthesis produces highly dispersed, monodispersed, nanometer sized gold particles embedded in silica matrices. Particle size is tested as a function of reaction stoichiometry, the gel monomer type, the drying procedure, and washed vs. unwashed samples. Particle size is independent of reaction stoichiometry, gel monomer type, and the effect of washing (Table 1). Average particle size and the size distribution is relatively constant (FIG. 1) exhibiting a monodisperse size distribution. For washed samples, particle size is independent of the drying procedure (xerogels vs. aerogels). It does appear that the particles are washed out of samples made with the pre-hydrolyzed form of the TEOS monomer. Few are observed within the gel by TEM. Particle size is roughly twice as large in gels as in pure inverse micelle solutions of DDAB and toluene. Electron diffraction from the clusters shows five rings that index to the presence of FCC-Au. The relative diffraction peak radii for the five rings are 1.0, 0.86, 0.61, 0.52, and 0.40.

Monitoring cluster size in solution and in wet gels as a function of time provides information on the growth mechanism and the effect of gelation on particle growth. Size is monitored by measuring the gold plasmon resonance observed by UV-visible spectroscopy. Colloidal sized gold in solution exhibits a plasmon resonance between 500 and 550 nm depending on particle size. Increasing particle size results in a red shift in the plasmon resonance. Immediately after salt reduction, the gold plasmon resonance occurs at 502 nm in gel monomer, DDAB, and toluene solutions. The plasmon resonance red shifts to 509 nm after three hours and stabilizes at 526 nm after seven days. If gelation is initiated to a new sample by adding TBAOH/water to the solution, the gold plasmon resonance is 518 nm and 527 nm after three hours and after seven days, respectively. The particles slowly grow after the reduction before stabilizing in both ungelled and gelled samples. The particle growth mechanism is faster, but the final particle size is unaffected by the gelation process (assuming constant medium refractive indices between ungelled and gelled samples).

Surface areas as determined by $N_2$ porosimetry are strongly dependent on the reaction stoichiometry, surfactant concentration, and gel monomer type. With a few exceptions, aerogel surface areas increase as the molar ratio of TBAOH/water to gel monomer increases and as surfactant concentration decreases. Aerogels formed with pre-hydrolyzed TEOS monomer exhibit higher surface areas than when formed with TEOS. When gold is embedded in the silica matrices, the surface areas increase and follow the same trend with reaction stoichiometry. To determine if surfactant changes the reaction chemistry and thus the material properties or obstructs the silica surface, the materials were washed with warm hexanol. Surface areas increase and follow similar trends with reaction stoichiometry. TEOS xerogels exhibit negligible surface areas. Pre-hydrolyzed TEOS xerogels exhibit similar surface areas and trends as do pre-hydrolyzed TEOS aerogels. The silica matrices are mesoporous with pore diameters ranging from 50–300 Å.

SAXS indicates that inverse micelles formed in DDAB/toluene solutions are small ($R_g$=0.49 nm) with only a few surfactant molecules forming each aggregate structure. Addition of gold salt or addition of both gold salt and TEOS have no effect on aggregate size. The scattering changes little. However, SAXS is not observed when only TEOS is added to inverse micelle solutions. TEOS alone causes dissolution of the surfactant aggregate structures. TEOS is rather polar, but is miscible in toluene. The driving force for surfactant aggregation decreases as the gel monomer acts as a co-solvent for toluene and the polar moieties of the surfactant. The surfactant molecularly disperses in the solvent.

The size of particles formed by the reduction of metal salts in typical inverse micelle solutions depends on the inherent size of the inverse micelles and the material exchange rate between inverse micelles. Both micelle size and the material exchange rate depend on experimental parameters such as the surfactant/solvent system, the addition of water which swells the inverse micelles, and the salt to surfactant ratio. Particle size control is often complicated but feasible. Our work with the TEOS, DDAB, and toluene system establishes three results. (1) The reduction reaction in the presence of a gel monomer and preceding gelation produces particles roughly two times larger than particles formed in typical DDAB/toluene mixtures. (2) The gelation has little effect on the final particle size as determined by the plasmon resonance, but does influence the initial growth rate. (3) The particle size is not dependent on the gel monomer type, the reaction stoichiometry, or the drying method.

The likely reason for the increase in particle size in the mixtures studied here compared to particles synthesized in traditional DDAB/toluene mixtures is a change in size or even nature of the inverse micelle structure. The SAXS indicates the presence of TEOS disrupts surfactant aggregation. The effect of TEOS on a change in the aggregation phenomena is not apparent when both gold salt and TEOS are present, perhaps due to the strong scattering of the metal, but it is likely that the inverse micelle structure is weakened. Such an effect would change the nature of the cluster growth and stabilization process resulting in larger cluster sizes. With the addition of the base and water solution, hydrolysis and condensation of the TEOS starts. The presence of water and the further production of water and alcohol in the reactions further destabilizes the inverse micelle structure. The clusters grow at a faster rate when hydrolysis and condensation occur as evidenced by the UV-visible spectra. However, the final particle size is unchanged in gelled systems compared to ungelled-gelled systems. Apparently, an upper bound in the stabilization process is reached.

Some of the variables adjusted in this study to control material properties include the gel monomer type, the water to gel monomer reaction stoichiometry, and the drying process (xerogels vs. aerogels). The monomer type and drying process were anticipated to have no direct effect on particle size control, and none was observed. More typical methods to control particle size include the surfactant/solvent system, the metal salt to surfactant ratio, and water content. Different surfactant/solvent systems were explored in this study (polyethoxyethylene (6) nonyl phenyl in cyclohexane and tetraethyleneglycol mono n-dodecyl ether in octane), but results were less fruitful. Silica particles resulted, or phase separation occurred with only the water rich phase gelling. Salt to surfactant ratios were not varied here. We attempted to control particle size through the use of water content. No particle size control is apparent in this effort most likely due to the destabilization of the inverse micelle structure in the presence of TEOS and the hydrolysis and condensation reactions. However, the principles of particle size control remain in this methodology and further effort is indicated to more completely understand the effect of this variable upon the process.

The relative rates of hydrolysis and condensation as effected by sol-gel processing parameters such as acid vs. base catalyzed reactions and the $H_2O$:Si ratio control the final gel properties. In general, hydrolysis dominates under acid-catalyzed, low $H_2O$:Si ratio conditions, and weakly branched, polymeric sols and gels are produced. Condensation dominates under base-catalyzed, high $H_2O$:Si ratio conditions to produce highly condensed particulate sols and gels. As condensation rates increase, gelation time and gel surface areas generally decrease.

For gels prepared with TEOS in inverse micelle solutions as the $H_2O$:Si ratio increases, gel times and surface areas increase in direct contradiction to the above stated conventional wisdom. We propose that the mechanism of gelation in the cluster solutions depends on the relative solubility's of the reactants in various 'areas' of the micro-heterogeneous solutions. TEOS is soluble in toluene, and DDAB is soluble in TEOS. Thus, TEOS most likely exists within the inverse micelle and throughout the solution. Decreased aggregation of DDAB in toluene with the introduction of TEOS as detected by SAXS supports this hypothesis. Added water is only soluble within the inverse micelle. Thus, gelation occurs mostly at the surfactant interface. Two important results stem from this conclusion. First, the effective $H_2O$:Si ratio is much higher than expected from the set $H_2O$:Si recipe resulting in high condensation rates. Gels are formed in this study even at low $H_2O$:Si recipes, and surface areas of TEOS gels are low. Second, with increasing $H_2O$:Si ratio, the $H_2O$:DDAB ratio increases. Increasing the $H_2O$:DDAB leads to larger, more polydisperse inverse micelles and a subsequent decrease in the surface area of reaction. Increasing the $H_2O$:Si recipe actually leads to a decrease in the effective $H_2O$:Si ratio, lower condensation rates, and the observed higher surface areas and faster gel times. Under this hypothesis, a unique gelation mechanism results, and the apparent contradiction of our data with conventional wisdom is explained.

Gel surface areas increase with decreasing surfactant concentration. This result is consistent with our proposed mechanism. As surfactant concentration decreases, the $H_2O$:DDAB ratio increases resulting in a decrease in the surface area of the reaction. Decreasing surfactant concentration leads to lower effective $H_2O$:Si ratios, lower condensation rates, and the observed higher surface areas. It is apparent from the increase in the gel surface area after the surfactant is washed away that surfactant also blocks the available gel surface. It is likely two mechanisms influence the surfactant effect on gel properties.

Gelation times are faster and surface areas are higher when the pre-hydrolyzed form of TEOS is used. These results indicate that the condensation rates for the pre-hydrolyzed TEOS monomer reactions are slower than for the TEOS monomer reactions. Steric effects are most likely responsible for the slower condensation rates with the bulkier monomer.

TABLE 1

| | AEROGELS | | | | XEROGELS | | | |
|---|---|---|---|---|---|---|---|---|
| | TEOS | | Pre-Hydrolyzed TEOS | | TEOS | | Pre-Hydrolyzed TEOS | |
| $H_2O$:Si | washed | not washed | washed | not washed | washed | not washed | washed | not washed |
| 2:1 | 5.8 +/− 1.3 | 5.6 +/− 1.5 | 5.7 +/− 1.3 | N/A | N/A | 6.0 +/− 1.5 | N/A | N/A |
| 4:1 | 5.6 +/− 1.1 | 6.7 +/− 1.1 | N/A | N/A | N/A | 6.7 +/− 2.2 | N/A | 7.1 +/− 1.2 |

EXAMPLES 2–9

(Palladium nanoclusters)

Dried gels sterically entrapping palladium (Pd) have also been prepared using the basic process of Example 1 above but with the following substitutions: Example 2, tetraethoxysilane (TEOS) mixed 4:1 water to gel precursor and with a 0.0005M salt concentration; Example 3, TEOS mixed 4:1 with a 0.001M salt concentration; Example 4, TEOS mixed 4:1 with 0.005M salt concentration; Example 5, TEOS mixed 4:1 with 0.01M salt concentration; Example 6, TEOS mixed 2:1 with 0.005M salt concentration; Example 7, TEOS mixed 2:1 with 0.01M salt concentration; Example 8, TEOS oligomer mixed 2:1 with 0.001M salt concentration; and Example 9, TEOS oligomer mixed 2:1 with 0.01M salt concentration. $PdCl_2$ is the salt. Several of these samples were successfully calcined.

EXAMPLES 10–11

(Rhodium nanoclusters)

Dried gels sterically entrapping rhodium have been prepared using the basic process of Example 1 above with the following substitutions: Example 10, TEOS oligomer mixed 2:1 with 0.001M salt concentration and $RhCl3$ as the salt; and Example 11, TEOS oligomer mixed 2:1 with 0.001M salt concentration and $Rh(CO_2CH_3)_2$ as the salt.

EXAMPLE 12

(Platinum nanoclusters)

A dried gel prepared according to the basic process of Example 1 was made with $PtCl_2$ as the salt with TEOS oligomer mixed 4:1 with a 0.001M salt concentration.

EXAMPLE 13

(Silver nanoclusters)

A dried gel prepared according to the basic process of Example 1 was made with $AgNO_3$ as the salt with TEOS oligomer mixed 4:1 with a 0.001M salt concentration. In the silver preparation, dilauryldimethylammonium chloride purchased from George Uhe Co., Inc. replaces DOAB as the surfactant to prevent the formation of AgBr which has the undesirable characteristic of being light sensitive.

EXAMPLE 14

(Platinum/Silver bimetallic nanoclusters)

A dried gel prepared according to the basic process of Example 1 was made with $AgNO_3$ and $PtCl_2$ as the salts with TEOS oligomer mixed 4:1 with 0.0005M salt concentrations for each salt. As in Example 13, dilaurylmethlyammonium chloride is used as the surfactant.

We have encapsulated nanometer sized Au and other metal particles in the micropores of xerogels and aerogels. The synthesis is a sequential reduction of a gold salt and sol-gel processing in an inverse micelle solution. The inverse micelle solution is used to solubilize the metal salt and provide a micro-reactor for the nucleation, growth, and stabilization of the nanometer sized clusters. Hydrolysis and condensation of an added siloxane monomer produces a wet gel embedding the particles. The presence of gel monomers de-stabilizes the inverse micelle structure resulting in larger particle sizes compared to typical inverse micelle synthesis techniques. Particle size control is complicated by the gel monomer effect on inverse micelle structure and the production of water and alcohol in the hydrolysis and condensation reactions. Finally, a unique gelation technique is outlined in these micro-heterogeneous solutions. Gelation occurs across the surfactant interface increasing the effective $H_2O$:Si ratio. Gelation occurs even at low $H_2O$:Si ratios, and condensation rates are high. Sol-gel parameters like the $H_2O$:Si ratio and, in this case, the surfactant concentration have unique and sometimes not intuitive effects on the hydrolysis and condensation rates and the resulting material properties.

Although the examples presented above are directed to the synthesis of nanoclusters of only Au, Pd, Rh, Pt, Ag and Pt/Ag bimetallics, it should be realized that the substitutions of other metals and materials as the constituents of the nanoclusters is possible and desirable for certain applications. Materials useful in catalysis are preferred candidates and include, but are not limited to, Fe, Ni, other iron-based and nickel-based materials, and CdS, $MoS_2$ and $FeS_2$. Alumina, titanium dioxide, and zirconium dioxide gel precursors can be substituted for the silica-based precursors recited in the examples. The true scope of the protected invention is to be found in the appended claims.

We claim:

1. A method to encapsulate a substance as a nanocluster having a size of from about 1–20 nm in a dried gel material comprising:
    combining a surfactant with an apolar solvent to form an inverse micelle mixture;
    adding a salt of the substance to the inverse micelle mixture and mixing to solubilize the salt in the mixture;
    adding a gel precursor solution and a reducing agent to the mixture to form a colloidal suspension of the substance in the mixture;
    adding a condensing agent to the mixture to form a gel; and
    aging and drying the gel which contains nanoclusters of the substance to form the dried gel material.

2. The method of claim 1 wherein the substance is selected from the group consisting of Au, Ag, Pd, Pt, Rh, Fe, Ni, bimetallic combinations of these metals, Fe-based compounds, Ni-based compounds, CdS, $MoS_2$ and $FeS_2$ and combinations thereof.

3. The method of claim 1 wherein the surfactant is a cationic surfactant.

4. The method of claim 3 wherein the surfactant is a quaternary ammonium salt surfactant.

5. The method of claim 1 wherein the surfactant is didodecyldimethylammonium bromide or dilauryldimethylammonium chloride.

6. The method of claim 1 wherein the apolar solvent is selected from the group consisting of cyclohexane, liquid alkane, and aromatic hydrocarbons and combinations thereof.

7. The method of claim 1 wherein the gel precursor solution is selected from the group consisting of solutions of tetramethoxysilane, tetraethoxysilane, polydiethoxysilane, octyl polysilsesquioxane, hexyl polysilsesquioxane, alumina-based gel precursors, titanium dioxide-based gel precursors, zirconium dioxide-based gel precursors, partially hydrolyzed versions of the preceding, and combinations thereof.

8. The method of claim 1 wherein the gel precursor solution is a silica-based gel precursor solution.

9. The method of claim 1 wherein the average size of the nanoclusters is less than about 10 nm.

10. The method of claim 9 wherein the average size of the nanoclusters is between about 5 and about 10 nm.

11. A method to encapsulate a catalytically active metal or metal compound as a nanocluster having a monodisperse size distribution with an average size of from about 1–10 nm in a dried gel material comprising:
    combining a quaternary ammonium salt surfactant with an apolar solvent to form an inverse micelle mixture;
    adding a salt of the metal or metal compound to the inverse micelle mixture and mixing to solubilize the salt in the mixture;
    adding a silica gel precursor solution and a reducing agent to the mixture to form a colloidal suspension of the metal or metal compound in the mixture;
    adding a condensing agent to the mixture to form a gel; and
    aging and drying the gel which contains nanoclusters of the metal or metal compound to form the dried gel material.

12. The method of claim 11 wherein the metal is gold, the apolar solvent is toluene, and the silica gel precursor solution is a solution of tetraethoxysilane and water.

13. The method of claim 11 wherein the dried gel material is an aerogel or a xerogel.

* * * * *